United States Patent
Zhang et al.

(10) Patent No.: US 7,301,580 B2
(45) Date of Patent: Nov. 27, 2007

(54) METHOD OF REALIZING COMBINATION OF MULTI-SETS OF MULTIPLE DIGITAL IMAGES AND BUS INTERFACE TECHNIQUE

(75) Inventors: Yuan Zhang, Shenzhen (CN); Xiongyu Zhu, Shenzhen (CN); Guangkui Wang, Shenzhen (CN); Jianghong Li, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 826 days.

(21) Appl. No.: 10/479,550

(22) PCT Filed: Dec. 14, 2001

(86) PCT No.: PCT/CN01/01624

§ 371 (c)(1),
(2), (4) Date: Dec. 3, 2003

(87) PCT Pub. No.: WO03/017664

PCT Pub. Date: Feb. 27, 2003

(65) Prior Publication Data

US 2004/0145678 A1   Jul. 29, 2004

(30) Foreign Application Priority Data

Jun. 4, 2001   (CN) ............................. 01 1 18607

(51) Int. Cl.
*H04N 7/12* (2006.01)
(52) U.S. Cl. .................... 348/388; 375/240.01
(58) Field of Classification Search ............ 348/388, 348/588, 564, 565, 388.1; 375/240.01, 240.02; 386/70; 710/27
See application file for complete search history.

(56) References Cited

U.S. PATENT DOCUMENTS

| | | | | |
|---|---|---|---|---|
| 5,301,240 A | * | 4/1994 | Stockum et al. | 382/100 |
| 6,052,744 A | * | 4/2000 | Moriarty et al. | 710/27 |
| 6,356,314 B1 | * | 3/2002 | Takebe | 348/564 |
| 6,415,098 B1 | * | 7/2002 | Taira | 386/70 |

FOREIGN PATENT DOCUMENTS

| | | |
|---|---|---|
| EP | 0909070 | 4/1999 |
| WO | WO 01/52544 | 7/2001 |

\* cited by examiner

*Primary Examiner*—Gims Philippe

(57) ABSTRACT

A method of digital image combination for multiple channels with multiple sets and a bus interface which includes an image-processing unit for m-channel sub-images, an image-processing unit for n-set combining images, n-set video data buses, address and control buses and a pixel data access control and bus switching logic module. A bus strobe signal controls m-channel sub-images pixel data outputting to one set of the n video data buses at a specific moment. The n sets of image-processing units for combining images combine the sub-images pixel data on the video data buses of n sets to form n integral image data. The method can be used in the multimedia image communication system and image editing system for raising the multiple image-processing capabilities.

11 Claims, 3 Drawing Sheets

METHOD OF REALIZING COMBINATION OF MULTI-SETS OF MULTIPLE DIGITAL IMAGES AND BUS INTERFACE TECHNIQUE

FIELD OF THE TECHNOLOGY

The invention generally relates to technology of transmitting or recurring any combined images, more specially, to a technique for implementing combination of multi-sets of multiple channels digital images and bus interface thereof. The invention can be used in the multipoint control units (MCU) of a videoconference system or image editing equipment.

BACKGROUND OF THE INVENTION

In a videoconference or image editing service, usually it is necessary to combine moving image (sub-image) signals of multiple channels to a single channel signal (one channel or one set of channels) in real time. The combined digital video image signal should include contents of original signals of multiple channels, and is same format and physical interface as a single digital image channel signal. Controlling the moving image of multiple channels, switching the data of the moving image of multiple channels and updating flexibly combination mode of the moving image of multiple channels need to be implemented through software in one hardware device. For example, images of multiple channels can be flexibly divided into sets and every set is combined in different modes.

The present conventional image divider (such as the product of US AD company) satisfies the requirement mentioned above, but only has a single fixed combination mode or several limited combination modes.

There are mainly two disadvantages of multiple channels images combination equipment at present:

1. Modes switching is mainly done by hardware, so the combination modes of multiple channels video images cannot be flexible;

2. Limited by performance and modality of the hardware interface, when a combination mode is more complex, the frame rate of combined original sub-images cannot be kept, so quality of the combined image is not good, and frame rate of combined image is low.

SUMMARY OF THE INVENTION

Objective of the invention is to provide a method for implementing image combination of the digital signal of multiple channels and bus interface thereof. With this method and bus interface, digital image signals of multiple channels can be flexibly switched and combination modes can be flexibly updated, multiple channels images (sub-images) can be flexibly grouped into sets and every set can have different combination mode.

The invention, a method for combining image data of multi-sets of multiple channels, is implemented by the scheme comprising the following steps:

A. integral video data of m channels from an original video channel are inputted to m sub-image channels accordingly, and respectively compressed to m-channel sub-image pixel data, the m-channel sub-image pixel data are stored in m FIFO sub-image frame memories;

B. bus strobe signals of m-channel sub-image pixel data control the moment when m-channel sub-image pixel data are outputted to a specified set bus;

C. sub-image pixel data on n-set video data buses are respectively combined to form n combined images, and integral video data are outputted from n-set combining image channels.

In said step A, generating sub-image pixel data with same scanning sequence as the original video data, but less column pixels and row pixels. The generated sub-image pixel data are stored at the low address of the FIFO sub-image frame memories.

In said step B, only one channel of sub-image pixel data is outputted at a specified moment. The sub-image pixel data of m channels are selectively switched to video data buses of n sets by said bus strobe signals.

In said step B, computing the corresponding sub-image channel address of every pixel of one field or one frame of combining image as a pixel address; storing the computed pixel addresses of one field or one frame to the memory according to the image scanning sequence to form a pixel address table; reading pixel address from the pixel address table under the control of video sync signal; selecting a set of video data buses and reading the $m^{th}$ sub-image pixel data, which are read by the $n^{th}$ set image-processing unit for combining images.

In the odd field and even field mode, there are two memories to store pixel address tables for odd field pixel data and even field pixel data, respectively. In the frame mode, there is one memory to store the pixel address tables of common frames.

In duration when the image combination mode is stable, the pixel address of every pixel for one field or one frame of combining image is computed only once and repeatedly read by every field or every frame.

The implementing scheme of the invention includes a bus interface for combination of multi-sets of multiple channels digital images. The implementing scheme includes an image-processing unit for m-channel sub-images, an image-processing unit for n-set combining images, video data buses of n sets, address and control buses, a pixel data read control and bus switching logic module and a clock and sync signal generating module;

m sub-image channels outputs of the image-processing unit for m-channel sub-images are synchronously connected to n-set video data buses, the n-set video data buses are synchronously connected to sub-image data inputs of the image-processing unit for n-set combining images, or fixedly connected to sub-image data inputs of the image-processing unit for less than n sets combining images;

said the address and control buses are synchronously connected to the image-processing unit for n-set combining images, the pixel data access control and bus switching logic module and the clock and sync signal generating module.

Every channel of said image-processing unit for m-channel sub-images is consisted of sequentially connecting a sub-image generating module, a FIFO sub-image frame memory, and a sub-image pixel data switching and allocating module. Every set of the image-processing unit for n-set combining images is consisted of connecting pixel address control module and combining control logic module. Said pixel address control module and said access control and bus switching logic module are connected with said address and control bus. Said pixel data access control and bus switching logic module is connected with m sub-images pixel data switching and allocating module. Said m sub-images pixel data switching and allocating module m and said n combining control logic module are connected to n sets video data buses.

Said pixel data access control and bus switching logic module, which is consisted of decoders, outputs a bus strobe signal to control a sub-image pixel data to be outputted to one set of video data buses. The bus strobe signal is decoded by a pixel address signal, which is outputted from the pixel address control module of a relating combining image, and video sync signal.

Said pixel address control module is consisted of connecting a CPU or DSP and a memory. The CPU or DSP computes corresponding sub-image address of every pixel of one field or one frame of combining image. The memory stores the computed pixel address to form a pixel address table for a field or frame.

Said address and control bus includes address bus, clock and sync signal bus and control bus. Said address bus is connected with the pixel address control module and said pixel data access control and bus switching logic module. Said clock and sync signal bus is connected with the image-processing unit for m-channel sub-images and image-processing unit for n-set combining images. Said control bus is connected with said m sub-image pixel data switching and allocating modules and the pixel data access control and bus switching logic module.

The invention, a method and an interface for combination of multiple sets of multiple channels digital image, has the following advantages:

1) The invention takes hardware as a signal-processing platform, and the functions of the platform are implemented by software. Since software is easier to update or change, so the combination mode is flexible. In practice, there are several hundred modes of combination can be switched rapidly under control of software.
2) The invention can flexibly divide sub-image channels into different sets and combination modes, so image-processing ability of the system is greatly raised, which satisfies multimedia image communication and image editing requirement.

BRIEF DESCRIPTION OF THE DRAWINGS

FIG. 1 shows ten typical image combination modes: FIGS. 1a, 1b, 1c, 1d, 1e, 1f, 1g, 1h, 1i and 1j.

EMBODIMENTS OF THE INVENTION

The invention will be described in more detail, hereinafter, with reference to drawings and embodiments.

In principle, number of sub-images that can take part in an image combination is unlimited. Nevertheless, limited by drive capacity of a bus interface chip and signal quality, the sub-images taking part in a combination process are no more than 16, in general. With special processing for signals drive and buses match, number of sub-image channel can be increased to 25 or more.

In theory, with software flexibility the combination modes of an image are almost unlimited. FIG. 1 shows ten typical combination modes. FIG. 1a is a combination mode consisted of two sub-images. FIG. 1b is a combination mode consisted of three sub-images. FIG. 1c is a combination mode consisted of four sub-images. FIG. 1d is a combination mode consisted of nine sub-images. FIG. 1e is a combination mode consisted of six sub-images. FIG. 1f is another combination mode consisted of four sub-images. FIG. 1g is a combination mode consisted of 16 sub-images. FIG. 1h is a combination mode consisted of eight sub-images. FIG. 1i is a combination mode consisted of 13 sub-images. FIG. 1j is another combination mode consisted of 13 sub-images.

The embodiment takes combination mode consisted of 16 sub-images as an example. The 16 (m=16) original images (16 sub-images) are divided into n sets (in general, n=1 to 4). Every set of sub-images applies one set of video data bus; so n-set sub-images respectively apply n-set video data buses to form combination image. During combination, there is one limitation that is every original image (it is output data of one sub-image physical channel) cannot take part in two or more than two image combination processing at a moment. Conforming to this limitation, original images from every channel can be grouped into many kinds of set or combined many kinds of modes. For example, original images of the first, second and third channel form the first set, original images of the forth, fifth, sixth and seventh channel form the second set, and original images of the eighth to sixteenth channel form the third set and so on.

Figure 2:
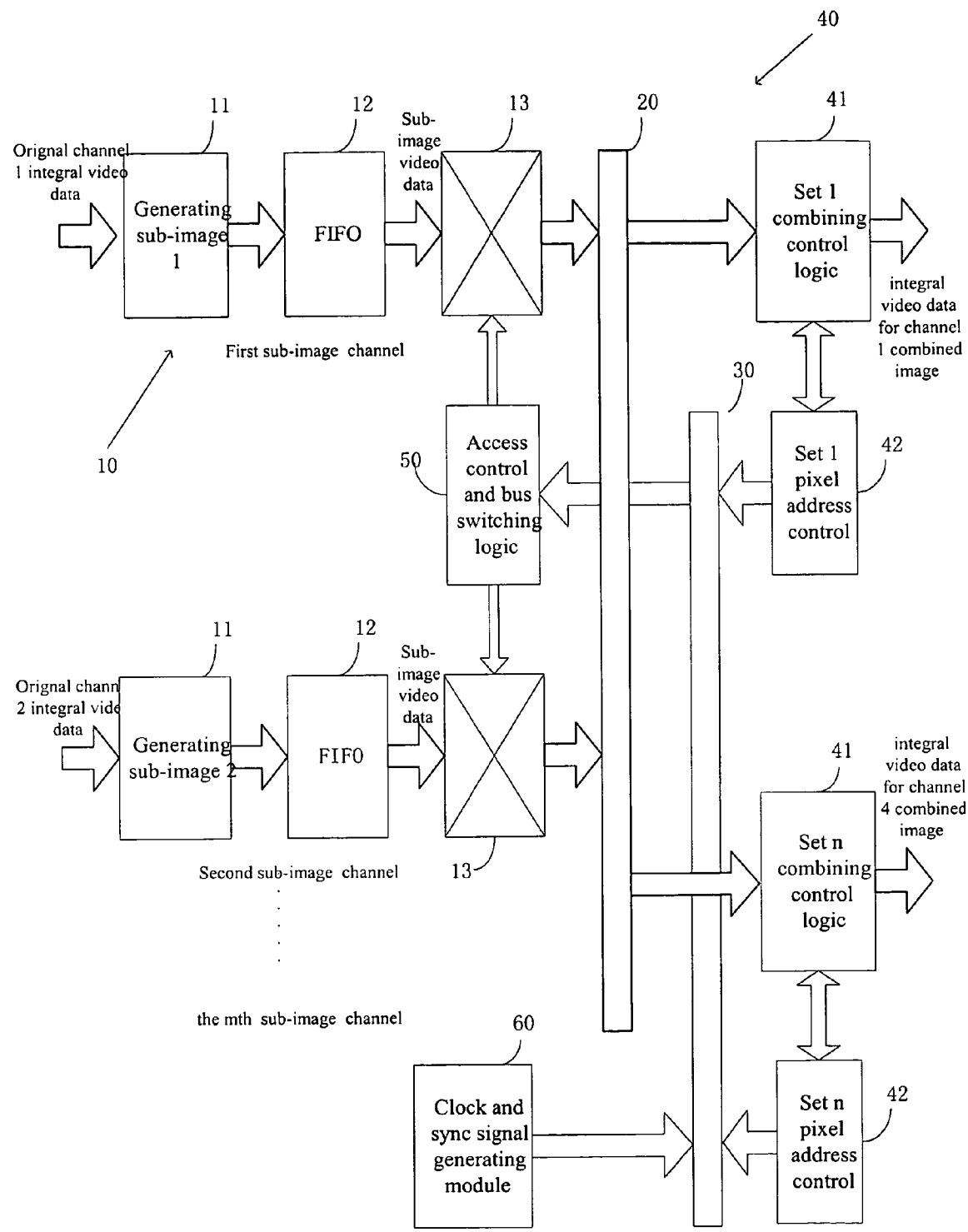
FIG. 2 shows a hardware block diagram for the digital image combination of multi-set signals of multiple channels in the invention.

Refer to FIG. 2, it shows the hardware structure for m (m=16) sub-images to be combined to n (n=4) sets. The hardware structure includes image-processing unit for multiple channels sub-image 10, video data bus of multiple images (the video data buses of n sets) 20, address and control bus 30, image-processing unit for multiple sets combining images 40, pixel data access control and bus switching logic module 50 and clock and synchronous signal module 60. The integral video data, coming from m-channel original video, are inputted to m sub-image channel and combined to n sets. The integral video data is outputted from n sets of combining image channel.

In the image-processing unit for multiple channels sub-image 10, each sub-image channel includes: a sub-image generating module 11, a FIFO (first-in-first-out) frame buffer memory module 12 and a switching and allocating module for sub-image pixel data 13. The modules 11, 12 and 13 are connected sequentially.

The sub-image generating module 11 compresses one channel of the integral digital image data corresponding to original video channel in pixel to generate the sub-image digital data. The integral digital image data in original can take two formats: one is the standard digital video format including CCIR-601 or CCIR-656 formats, another is common intermediate format which is same as scanning sequence of display and isn't distinguished odd field and even field, such as the CIF format. Using DSP (digital signal processor), original image data with these two formats can be compressed in pixel to generate a sub-image data, which has the original scanning sequence but less row pixels and column pixels than original image. For the first format, there is a special chip for image compression.

The FIFO frame buffer memory module 12 is used for storing temporarily compressed original image data. When each frame or field of original image has been compressed, it is difficult to synchronize the sub-images with different size, so the compressed data are stored in the FIFO frame buffer memory and each frame or field of original image can refresh the FIFO frame buffer memory. The compressed sub-image data are stored in low address of the FIFO frame buffer memory.

There are two functions of the switching and allocating module for sub-image pixel data 13. One is to guarantee that at any moment there is only one sub-image pixel data is outputted to the same set of video data buses of multiple images 20, which is a tri-state bus. Another is to switch selectively every channel of sub-image data to different set data bus (such as one of the four set buses), when there are multiple sets (such as four sets). In a period of time, which can be several hours or several minutes, the grouping of m sub-images is definite. Therefore, allocation relation of the video data buses of multiple images 20 is also definite and is controlled by the system CPU. The address and control bus from image-processing unit for multiple sets combining images 40 and CPU of the system implemented jointly the two functions.

The pixel data access control and bus switching logic module 50 is consisted of several decoders. Input signals of module 50 come from the address and control bus 30 including pixel address signal sent by pixel address control module in image-processing unit for multiple sets combining images 40 and video synchronous signal. Output signals of module 50 are the strobe signal of sub-image pixel data of every channel, which are used to control the sub-image pixel data to be outputted to a set of the video data bus at a specified moment. The module 50 can be put on the side of the image-processing unit for multiple channels sub-image 10, such as FIG. 2, or on the side of the image-processing unit for multiple sets combining images 40, such as FIG. 3.

Figure 3:
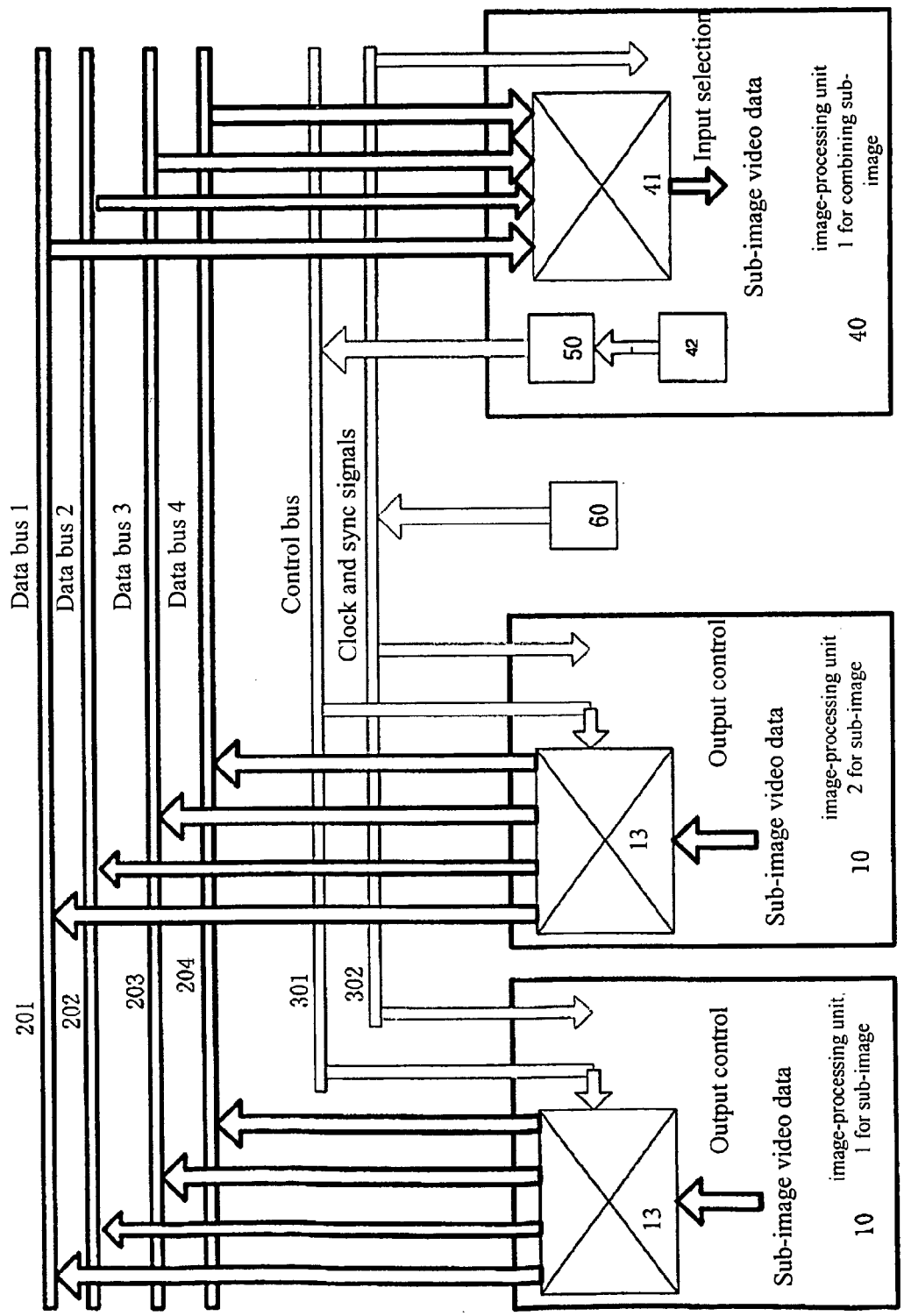
FIG. 3 shows connection between buses for multi-sets combination of the multiple channels digital image signals and interface modules in the invention.

Refer to FIGS. 2 and 3, the video data buses of multiple images 20 are consisted of four-set video data buses: 201, 202, 203 and 204. FIG. 3 shows typical connections between the four video data buses and interface modules.

The video data buses of multiple images 20 can be divided into one set or several sets. In general, it is four sets or less than four sets, and it is four sets in this embodiment. Every set of the video data buses, 201, 202, 203 or 204, is connected to the outputs of all sub-image channels in the units 10, i.e., the outputs of all channels of switching and allocating module for sub-image pixel data 13. At the same time, every set of the video data buses, 201, 202, 203 or 204, is also connected to the inputs of all images combination units i.e. the combining control logic module for combining images 41 in the unit 40. Of course, they can be respectively connected to one image combination unit as shown in FIG. 3. Every set of video data buses 201, 202, 203 or 204 comprises 16 or 8 video data lines to transfer color difference, brightness signals etc. of the YUV data.

It is necessary to explain that the video data buses of multiple images 20 can be one set buses or multiple sets buses. It is unnecessary that the inputs of image-processing unit for multiple sets combining images 40 should be circularly connected with all multiple sets of the video data buses. The input of image-processing unit for multiple sets combining images 40 can be fixedly connected with only one set of video data buses. Module 50 can be put on the side of the image-processing unit for multiple channels sub-image 10 (such as FIG. 2), or on the side of the image-processing unit for multiple sets combining images 40 (such as FIG. 3).

In order to have a good quality signals in the buses, it is necessary to have impedance match for each video data signal. In general, the ABT type (one kind of bus drive chips) interface chip is used for the bus drive.

The address and control bus 30 in FIG. 2 is control bus 301, clock and synchronous bus 302 in FIG. 3. The address and control bus 30 includes video synchronous signals, video pixel address signal/sub-image strobe signals. The video synchronous signals include a 27 MHz main clock, a 13.5 MHz or 6.75 MHz pixel clock, a field-synchronizing signal, a line-synchronizing signal and mixed blanking signal etc. The video synchronous signals are provided to the image-processing unit for multiple channels sub-image 10 and image-processing unit for multiple sets combining images 40. The signal type of video pixel address signal/sub-image strobe signal depends on where the pixel data access control and bus switching logic module 50 is put on. The pixel address control module for combining images 42 in every set of the image-processing unit for multiple sets combining images 40 sends out a image channel number (address) corresponding to the pixel data to read at every pixel clock after the pixel data access control and bus switching logic module 50 decodes the image channel number (address), the module 50 generates a strobe signal that selects the $m^{th}$ channel sub-image data to be read by the $n^{th}$ combining image process unit. The video data is read from the FIFO 12 of the $m^{th}$ sub-image channel.

In the invention, the multiple images video buses can be a general name for video data buses of multiple channels 20, control bus 301 or clock and synchronous signal bus 302. In the FIG. 3 embodiment, the pixel data access control and bus switching logic module 50 is put on the position where it is near the image-processing unit for multiple sets combining images 40.

The pixel address control module of combining image 42 is consisted of CPU or DSP and memory. According to the background requirement, the CPU or DSP computes a corresponding sub-image channel number (address) of every pixel data of a field or frame of combining image as a pixel address. Then, a field or frame of the pixel addresses is stored in the memory according to the image scanning sequence. In the odd field and even field mode, two memories are needed to respectively store pixel addresses table of odd field data and pixel addresses table of even field data. In the frame mode, only one pixel addresses table of a common frame is needed.

The memory can be a FIFO frame buffer memory or a SRAM (static RAM) frame buffer memory. In duration, such as several minutes or several hours, combination mode of multiple images is relatively stable and don't need be switched continually. Therefore, for a definite mode, pixels address needs to be computed only once and is stored in the memory. Then, under control of video sync signal, every field or frame of the pixels address is read from the memory repeatedly. This belongs to clock operation of hardware. Pixel address table is obtained by large of computation. If every field or frame is computed in real time, high speed DSP is applied and the cost is high. So it is unnecessary to compute pixel address table of every field or frame.

The combining control logic module for combining images 41 and the pixel address control module of combining image 42 constitute the image-combining sub-module. When every sub-image video data outputs to video data buses of multiple channels 20 in a specified sequence, a data format and sequence of a combined image has been formed. Nevertheless, in order to enhance function of system, every image combining sub-module must implement the following two functions: selecting one set video data buses from the multiple set video data buses (or fixed connection), substituting pixels and adding captions and boarders. The function of substituting pixels is to pad a fixed color to the blank sub-image area in the combined image. Padding color in an area can be implemented directly in the video data bus with push up or pull down mode, or implemented by other sub-module accompanying with the captions. Since they do not belong to the invention, so they are not described in more detail.

Special video devices or logic circuits can make the clock and synchronous signal module 60.

The invention, implementing image combination and bus interface thereof, has been tested in a MCU system of videoconference, and it is proved that object of the invention has been reached. With its powerful processing ability for multiple image combination and better performance, the invention can be used in the multimedia image communication.

The invention claimed is:

1. A method for implementing combination of multi-sets of multiple channels digital image, comprising:
   A. inputting m-channel integral video data from an original video channel to m sub-image channels accordingly, respectively compressing the m-channel integral video data to m-channel sub-image pixel data and storing the m-channel sub-image pixel data in m FIFO sub-image frame memories;
   B. controlling the m-channel sub-image pixel data by their bus strobe signals, outputting to appointed one of n-set video data buses at an appointed moment;
   C. respectively combining the sub-image pixel data on n-set video data buses to form n-set combined image data and outputting integral video data from n-set combining image channels.

2. The method according to claim 1, wherein step A comprising: generating sub-image pixel data with same scanning sequence as original video data, but less column pixels and row pixels than original video data, and storing the sub-image pixel data in the low address of the FIFO sub-image frame memories.

3. The method according to claim 1, wherein step B comprising: at an appointed moment, outputting only one channel sub-image pixel data of every set of video data buses, selectively switching to n-set video data buses.

4. The method according to claim 1, wherein step B further comprising: computing a corresponding sub-image channel address of every pixel for one field or one frame of combining image as a pixel address; storing said computed one field or one frame of pixel addresses in a memory according to the image scanning sequence to form a pixel address table; reading the pixel addresses from said pixel address table under control of video sync signal; strobing a set of video data buses and reading the $m^{th}$ sub-image pixel data by said $n^{th}$ set image-processing unit for combining images.

5. The method according to claim 4, in an odd field and even field mode, storing pixel address tables of odd field and pixel address tables of even field in two memories respectively; in a frame mode, storing pixel address tables of common frames in one memory.

6. The method according to claim 4, the step of computing every pixel address for one field or one frame of combining image comprising: in duration when image combination mode is stable, computing only once the pixel address of every pixel for one field or one frame of combining image, storing the computed pixel addresses and repeatedly reading by every field or every frame.

7. A bus interface for combination of multi-sets of multiple channels digital images, includes an image-processing unit for m-channel sub-images, an image-processing unit for n-set combining images, n-set video data buses, address and control buses, a pixel data access control and bus switching logic module, and a clock and sync signal generating module;
   m sub-image channels outputs of the image-processing unit for m-channel sub-images are synchronously connected to n-set video data buses, the n-set video data buses are synchronously connected to sub-image data inputs of the image-processing unit for n-set combining images, or fixedly connected to sub-image data inputs of the image-processing unit for less than n sets combining images;
   said address and control buses are synchronously connected to the image-processing unit for n-set combining images, the pixel data access control and bus switching logic module and the clock and sync signal generating module.

8. The bus interface according to claim 7, wherein every channel of said image-processing unit for m-channel sub-images is consisted of sequentially connecting a sub-image generating module, a FIFO sub-image frame memory, and a sub-image pixel data switching and allocating module;
   every set of the image-processing unit for n-set combining images is consisted of connecting a pixel address control module for combining image and a combining control logic module for combining image; said pixel address control module and said pixel data access control and bus switching logic module are connected to said address and control bus; said pixel data access control and bus switching logic module is connected to the m sub-images pixel data switching and allocating module; said m sub-images pixel data switching and allocating module and said n combining control logic module are synchronously connected to n-set video data buses.

9. The bus interface according to claim 8, said pixel data access control and bus switching logic module consisted of decoders, outputs bus strobe signals to control a sub-image pixel data to be outputted to one set of video data buses; said bus strobe signals are decoded by a pixel address signal outputted from the pixel address control module of a relating combining image and video sync signal.

10. The bus interface according to claim 8, said pixel address control module is consisted of a CPU or DSP and a memory, connected together; said CPU or DSP computes pixel address of every pixel for one field or one frame of combining image; said memory stores said computed pixel addresses to form the pixel address table for one field or one frame of combining image.

11. The bus interface according to claim 8, said address and control bus including an address bus, a clock and sync signal bus and a control bus; said address bus is connected to the pixel address control module and said pixel data access control and bus switching logic module; said clock and sync signal bus is connected to the image-processing unit for m-channel sub-images and image-processing unit for n-set combining images; said control bus is connected to said m sub-image pixel data switching and allocating modules and said pixel data access control and bus switching logic module.

* * * * *